United States Patent
Takahashi et al.

(10) Patent No.: US 10,313,011 B2
(45) Date of Patent: Jun. 4, 2019

(54) FREE SPACE OPTICAL RECEIVER AND FREE SPACE OPTICAL RECEIVING METHOD

(71) Applicant: NEC Corporation, Minato-ku, Tokyo (JP)

(72) Inventors: Seigo Takahashi, Tokyo (JP); Toshiharu Ito, Tokyo (JP); Akihiro Tanaka, Tokyo (JP); Kohei Hosokawa, Tokyo (JP); Manabu Arikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/529,145

(22) PCT Filed: Nov. 18, 2015

(86) PCT No.: PCT/JP2015/005768
§ 371 (c)(1),
(2) Date: May 24, 2017

(87) PCT Pub. No.: WO2016/088318
PCT Pub. Date: Jun. 9, 2016

(65) Prior Publication Data
US 2017/0264365 A1 Sep. 14, 2017

(30) Foreign Application Priority Data
Dec. 1, 2014 (JP) ................................. 2014-243148

(51) Int. Cl.
*H04B 10/118* (2013.01)
*H04B 10/112* (2013.01)
(Continued)

(52) U.S. Cl.
CPC ......... *H04B 10/118* (2013.01); *H04B 10/112* (2013.01); *H04B 10/2581* (2013.01); *H04B 10/548* (2013.01); *H04B 10/676* (2013.01)

(58) Field of Classification Search
CPC ........................................ H04B 10/11–10/118
See application file for complete search history.

(56) References Cited

U.S. PATENT DOCUMENTS

| 9,564,968 B2 * | 2/2017 | Chen ................... H04B 10/1121 |
| 2010/0172649 A1 * | 7/2010 | Graves ................ H04B 10/1123 398/118 |

(Continued)

FOREIGN PATENT DOCUMENTS

JP    2013535871 A    9/2013

OTHER PUBLICATIONS

Translation of the Written Opinion dated Jan. 19, 2016, from the International Bureau in counterpart International application No. PCT/JP2015/005768.

(Continued)

*Primary Examiner* — Nathan M Cors

(57) ABSTRACT

It is difficult in a free space optical receiver to satisfy both of the stable receiving and the highly sensitive receiving; therefore, a free space optical receiver according to an exemplary aspect of the present invention includes a light collecting means for collecting laser light having propagated through a free space transmission path; a multimode light generating means for receiving input of the laser light collected by the light collecting means, exciting multimode light, and outputting multimode propagation light including a plurality of propagation mode light beams with a number smaller than a number of multimode light beams possible to be excited; and a mode separating means for separating the multimode propagation light into the plurality of propaga- (Continued)

tion mode light beams and outputting the plurality of propagation mode light beams.

17 Claims, 8 Drawing Sheets

(51) Int. Cl.
*H04B 10/2581* (2013.01)
*H04B 10/548* (2013.01)
*H04B 10/67* (2013.01)

(56) References Cited

U.S. PATENT DOCUMENTS

| | | | | |
|---|---|---|---|---|
| 2014/0126902 A1* | 5/2014 | Swanson | ............ | H04J 14/00 398/43 |
| 2014/0209798 A1* | 7/2014 | Woodward | ............ | G02B 6/04 250/227.28 |

OTHER PUBLICATIONS

Leon-Saval, S.G., et al., "Mode-selective photonic lanterns for space-division multiplexing", Optics Express, vol. 22, No. 1, Jan. 13, 2014, 9 pages.

Ryf, R., et al., "Photonic-Lantern-Based Mode Multiplexers for Few-Mode-Fiber Transmission", Optical Fiber Communications Conference and Exhibition, Optical Society of America, 2014, 3 pages.

* cited by examiner

FIG. 5

| CONFIGURATION | | | SIGNAL AMOUNT (S) | | NOISE (N) | INFORMATION AMOUNT (S/N RATIO) |
|---|---|---|---|---|---|---|
| | | | CORE AREA RATIO | SMF CONVERSION EFFICIENCY | | |
| REFERENCE CONFIGU-RATION | [SMF/FA diagram] | SMF COUPLING | 1 φ10μm | 1 | 1 | 1 ≒1/1 |
| PTL1 | [SMF/FA bundled diagram] | BUNDLED SMF COUPLING | 2.5 φ50μm CORE RATIO 10% | 1 | √2.5 | 1.6 ≒√2.5 |
| | [MMF/SMF/FA diagram] | LARGE DIAMETER MMF COUPLING+TAPERED SMF CONVERSION | 25 φ50μm | (0.1) | 1 | 2.5 ≒25×0.1/1 |
| PRESENT EXAMPLE EMBODIMENT | [MMF/FMF/FA diagram] | LARGE DIAMETER MMF COUPLING +TAPERED FMF CONVERSION +FM-EDFA +MODE SEPARATION | 25 φ50μm | 1 | √15 FMF | 6.5 ≒25/√15 |

FREE SPACE OPTICAL RECEIVER AND FREE SPACE OPTICAL RECEIVING METHOD

This application is a National Stage Entry of PCT/JP2015/005768 filed on Nov. 18, 2015, which claims priority from Japanese Patent Application 2014-243148 filed on Dec. 1, 2014, the contents of all of which are incorporated herein by reference, in their entirety.

The present invention relates to free space optical receivers and free space optical receiving methods, in particular, to a free space optical receiver and a free space optical receiving method to perform optical communication using a laser light beam propagating through a free space.

BACKGROUND ART

In recent years, by the development of remote sensing technologies, observational instruments mounted in aircraft and artificial satellites have grown in performance, and the amount of information transmitted from the air to the ground is increasing. In order to efficiently transmit, to the ground, data to be generated in observation instruments having more improved performance in the future, a free space optics (FSO) system that uses an optical frequency band, by which a wider bandwidth can be expected more considerably than by microwaves, has been studied.

In order to achieve a large-capacity free space optics (FSO) system, it is necessary to employ a high-speed technology for a bit rate of a transmission signal and a wavelength multiplexing technology. In the free space optics (FSO) system that performs an ultra-long distance transmission from an artificial satellite and the like to the ground, a highly sensitive receiver is required because the signal light is largely attenuated due to propagation through the free space. In this case, it is efficient to apply a common technology with an optical fiber communication technology, that is, an optical transmitting and receiving technology using a single mode fiber (SMF). The reason is that it is possible to use a direct optical amplification technology with low noise and high gain, a highly sensitive digital coherent receiving technology, a high bit rate transmitting and receiving technology, a dense wavelength division multiplexing (DWDM) technology and the like, for example.

Up to now, such a free space optics (FSO) system applying a technology using a single mode fiber (SMF) has been developed. In the free space optics (FSO) system applying the technology using a single mode fiber (SMF), it is necessary to couple laser light to a single mode fiber (SMF) with a small core diameter.

In the FSO system that transmits the signal light over a long distance from an artificial satellite and the like, a free space optics (FSO) receiver needs to have a telescope with a large opening size in order to focus light having sufficient optical power. In this case, because the diameter of the telescope is several times as large as a spatial coherence radius of the laser light that has been propagated through the atmosphere, the laser light becomes susceptible to atmospheric turbulence such as wind. Consequently, there has been a problem that the degree of fluctuation of beam spots of the laser light focused by the telescope becomes large.

At this time, there is a problem that it is difficult to communicate stably because the intensity of laser light incident upon an optical receiver fluctuates a lot due to the fluctuation of the beam spots. Particularly, when strong damping due to large intensity fluctuation (fade) arises, an error or a loss of received data occurs; as a result, the overhead of an error-correction code (Forward Error Correction (FEC)) increases, or a retransmission process is required. This causes the effective throughput of the free space optics (FSO) system to decrease.

As described above, there has been the problem in the free space optics (FSO) system that communications become unstable due to a wave-front distortion that the laser light suffers during the atmospheric propagation.

A technique to solve the problem is disclosed in Patent Literature 1. A related free space optics (FSO) receiver described in Patent Literature 1 includes a telescopic collection system, a wavelength demultiplexer, photodetectors, analog-to-digital converters, and a digital signal processor. The free space optics (FSO) receiver has a configuration in which the light is collected from the wavelength demultiplexer into a plurality of individual fiber end faces, and using a tapered fiber bundle or a tapered single fiber, signal light is concentrated into a single output fiber for input to the photodetector.

The related free space optics (FSO) receiver is configured to collect light, using a collection lens, onto a large-aperture surface of a multimode fiber bundle that is obtained by fusing single mode fibers. This makes it possible to achieve stable fiber coupling for fluctuation of beam spots. In addition, a core diameter is tapered to be thinner to a diameter equal to that of a single mode fiber (SMF), which enables coupled laser light beams to be concentrated at the core of the SMF and to connect with optical components adapted to the SMF in a subsequent stage.

CITATION LIST

Patent Literature

[PTL 1] Japanese Unexamined Patent Application Publication (Translation of PCT Application) No. 2013-535871

SUMMARY OF INVENTION

Technical Problem

As mentioned above, Patent Literature 1 discloses the related FSO receiver using the tapered fiber bundle or the tapered single fiber.

In the configuration in which the fiber bundle is used, it prevents the fade to figure out the sum of laser light beams coupled to the cores of a plurality of fibers. In this configuration, the amount of laser light to be received increases in proportion to the number of bundled single mode fibers (SMFs). However, the laser light with which a clad of a fiber is irradiated leads to a loss because it is not coupled to the core. For example, the expected value of the event that the core is irradiated with the laser light is only 10% taking into consideration the proportion of the area of a core in the cross-sectional area of a fiber. Consequently, the configuration cannot be very effective in reducing the occurrence of large fade associated with a change in state of beam spots due to the atmospheric turbulence.

In addition, even in the configuration where the core diameter of a single core multimode fiber (MMF) is tapered to the diameter of a SMF, it is impossible to couple all energy of propagation modes excited in the MMF to the SMF without loss. This is because a high order propagation mode that is not able to propagate through the SMF radiates to a clad and results in a loss in the process of reducing the core diameter of a tapered part. As a result, if the high order propagation mode is excited in the MMF due to disturbed beam spots, the fade occurs because of never being coupled to the SMF.

For the reasons set forth above, in the related free space optics (FSO) receiver described in Patent Literature 1, a stable receiving operation is difficult.

Instead of the configuration using the gradually tapered single fiber described in Patent Literature 1, it is also possible to apply a mode multiple separation technology and a multimode optical amplification technology that are used for a mode multiple transmission technology by a MMF, and a signal processing technology. This is because the mode multiple separation technology is capable of demultiplexing a propagation mode in a MMF into a propagation mode in a SMF.

As mentioned above, in order to achieve stable free space optical receiving, it is necessary to use a multimode fiber (MMF) with a large core diameter. However, because the number of propagation modes in the MMF increases in proportion to the square of the core diameter, extremely numerous propagation modes arise in the MMF having a large core diameter.

Specifically, the number of propagation modes that can be excited in a MMF having a core diameter of 50 µm amounts to about 250. The focused laser light, with its intensity divided, is coupled to a part of the propagation modes. For example, if it is assumed to be divided into 100 modes with equal intensity, the optical signal intensity of each mode degrades by 20 dB compared to a case in which the laser light propagates in a single propagation mode. However, it is very difficult to achieve highly sensitive receiving by a signal with the signal-noise ratio deteriorated by 20 dB.

On the other hand, if a multimode optical amplifier is used, it is possible to amplify laser light optically before the laser light undergoes an excessive loss due to the mode separation. Consequently, it is possible to make a free space optical receiver highly sensitive.

At this time, in the multimode optical amplifier, amplified spontaneous emission (ASE) noise arises in all modes through which the laser light can be propagated. Accordingly, in a MMF having a large core diameter, the ASE is distributed to extremely numerous propagation modes. As a result, the S/N ratio of a signal inputted into a digital signal processor (DSP) deteriorates, which makes difficult highly sensitive free space optical receiving.

Specifically, in the above-mentioned configuration example using the MMF with a core diameter of 50 µm, the amplified spontaneous emission (ASE) is emitted from the multimode optical amplifier even to the remaining 150 modes that have not been excited. At this time, if it is assumed that the intensity of the ASE distributed to each mode is constant, the total amount of noises, the noses are inputted into all optical receivers that receive mode-separated optical signals, increases by about 20 dB. In this case, it is also very difficult to achieve highly sensitive receiving by a signal with the S/N ratio largely deteriorated.

As described above, there has been the problem that it is difficult in a free space optical receiver to satisfy both of the stable receiving and the highly sensitive receiving.

The object of the present invention is to provide a free space optical receiver and a free space optical receiving method that solve the above-mentioned problem that it is difficult in a free space optical receiver to satisfy both of the stable receiving and the highly sensitive receiving.

Solution to Problem

A free space optical receiver according to an exemplary aspect of the present invention includes a light collecting means for collecting laser light having propagated through a free space transmission path; a multimode light generating means for receiving input of the laser light collected by the light collecting means, exciting multimode light, and outputting multimode propagation light including a plurality of propagation mode light beams with a number smaller than a number of multimode light beams possible to be excited; and a mode separating means for separating the multimode propagation light into the plurality of propagation mode light beams and outputting the plurality of propagation mode light beams.

A free space optical receiving method according to an exemplary aspect of the present invention includes collecting laser light having propagated through a free space transmission path; converting the laser light collected into multimode light, and generating multimode propagation light including a plurality of propagation mode light beams with a number smaller than a number of multimode light beams possible to be excited; and separating the multimode propagation light into the plurality of propagation mode light beams.

Advantageous Effects of Invention

According to the free space optical receiver and the free space optical receiving method of the present invention, it is possible to satisfy both of the stable receiving and the highly sensitive receiving.

BRIEF DESCRIPTION OF DRAWINGS

FIG. 5 is a table to describe the effects by the free space optical receiver according to the third example embodiment of the present invention.

EXAMPLE EMBODIMENT

Hereinafter, with reference to the drawings, example embodiments of the present invention will be described. The arrow direction in the figures shows an example, and does not limit the direction of signals between blocks.

A First Example Embodiment

Figure 1:
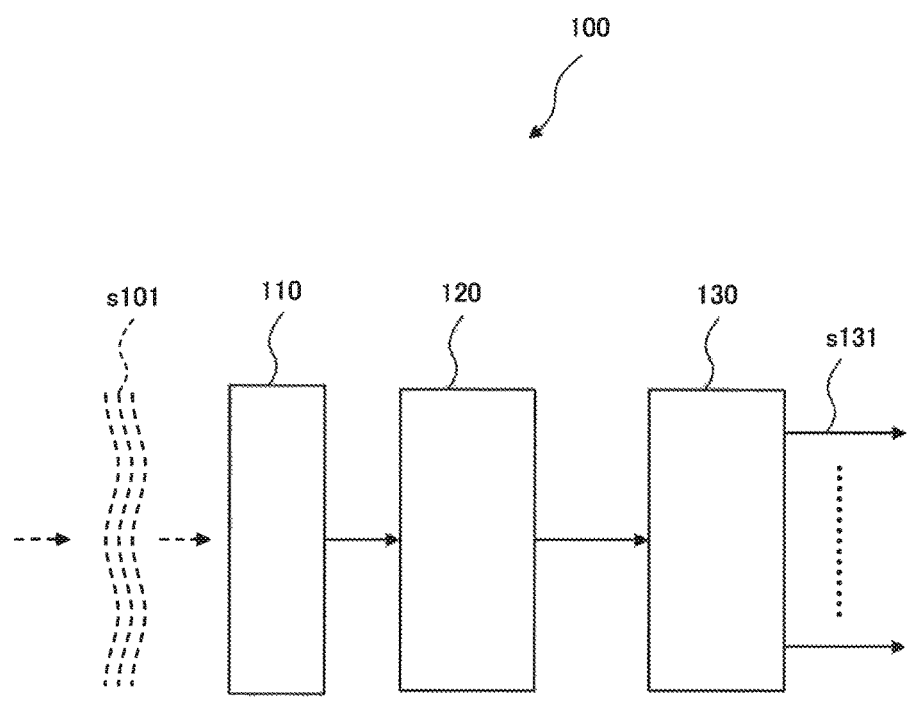
FIG. 1 is a block diagram illustrating a configuration of a free space optical receiver according to a first example embodiment of the present invention.

FIG. 1 is a block diagram illustrating a configuration of a free space optical receiver 100 according to a first example embodiment of the present invention. The free space optical receiver 100 includes a light collecting means 110, a multimode light generating means 120, and a mode separating means 130.

The light collecting means 110 collects laser light s101 having propagated through a free space transmission path. The multimode light generating means 120 receives input of the laser light s101 collected by the light collecting means 110, excites multimode light, and outputs multimode propagation light including a plurality of propagation mode light beams with a number smaller than a number of multimode light beams possible to be excited. The mode separating means 130 separates the multimode propagation light into the plurality of propagation mode light beams s131 and outputs the plurality of propagation mode light beams s131.

As mentioned above, in the free space optical receiver 100 in the present example embodiment, the multimode light generating means 120 is configured to receive input of the laser light s101 and excite the multimode light. This makes it possible to increase an area of a light receiving surface of the multimode light generating means 120 that receives input of the laser light s101. This makes it possible to stably receive the laser light s101 even where fluctuations arise in beam spots of the laser light s101. At this time, the multimode light generating means 120 is configured to output the multimode propagation light including the plurality of propagation mode light beams with the number smaller than the number of the multimode light beams that can be excited. This makes it possible to prevent a decrease in light intensity of each of the propagation mode light beams s131; therefore, it becomes possible to achieve the highly sensitive receiving.

As described above, according to the free space optical receiver 100 of the present example embodiment, it is possible to satisfy both of the stable receiving and the highly sensitive receiving.

The light collecting means 110 includes a telescope with a narrow viewing angle, which makes it possible to achieve long-range free space optical receiving. Specifically, for example, the light collecting means 110 includes an optical system with a viewing angle equal to or less than 1 mrad, which enables the free space optical receiver 100 to receive the laser light s101 that has propagated farther than 1 km.

Next, a free space optical receiving method according to the present example embodiment will be described.

In the free space optical receiving method of the present example embodiment, first, laser light having propagated through a free space transmission path is collected. Then the laser light collected is converted into multimode light, and multimode propagation light is generated that includes a plurality of propagation mode light beams with a number smaller than a number of multimode light beams possible to be excited. Finally, the multimode propagation light is separated into a plurality of propagation mode light beams.

By using the above-mentioned method, according to the free space optical receiving method of the present example embodiment, it is possible to satisfy both of the stable receiving and the highly sensitive receiving.

A Second Example Embodiment

Figure 2:
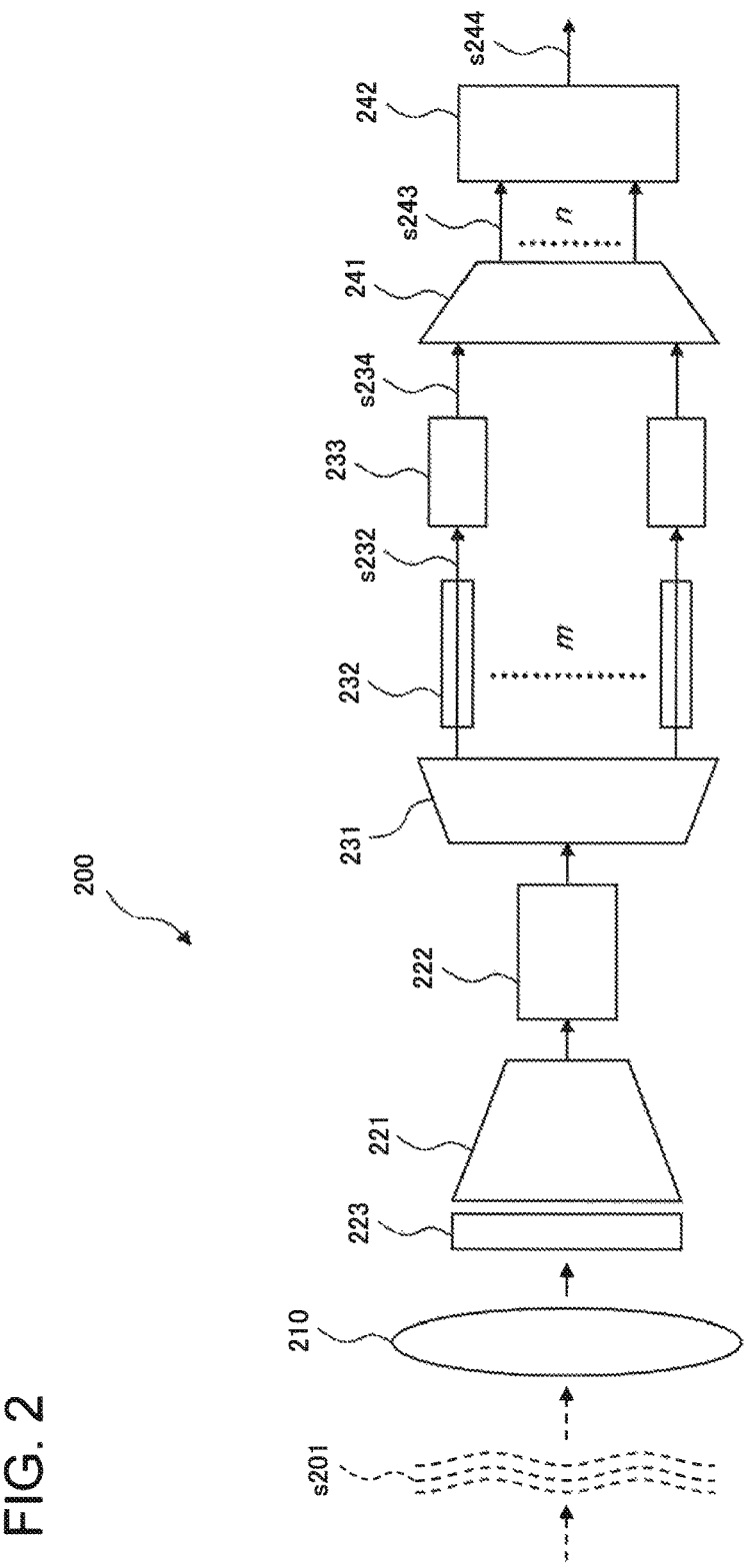
FIG. 2 is a block diagram illustrating a configuration of a free space optical receiver according to a second example embodiment of the present invention.

Next, a second example embodiment of the present invention will be described. FIG. 2 is a block diagram illustrating a configuration of a free space optical receiver 200 according to the second example embodiment of the present invention.

The free space optical receiver 200 includes a light collecting unit 210 serving as a light collecting means, a multimode medium 221 serving as a multimode light exciting means, a multimode fiber (MMF) 222 serving as a multimode transmission medium, and a mode separating unit 231 serving as a mode separating means. The multimode medium 221 and the multimode fiber (MMF) 222 constitute a multimode light generating means.

The free space optical receiver 200 further includes a plurality of single mode transmission media 232, a plurality of optical receivers 233 serving as light receiving means, a signal selector (a selector) 241 serving as a signal selection means, and a signal processor (DSP) 242 including a signal processing means and a photoelectric conversion means.

The light collecting unit 210 is composed of a light collection optical system including an optical antenna, and focuses laser light s201 with the wave front disturbed through the space propagation on the multimode medium 221. Because the core of the multimode medium 221 that is irradiated with a beam spot of the laser light s201 has a sufficiently wide area for fluctuation of the beam spot, it is possible to achieve stable fiber coupling of the laser light s201.

The multimode medium 221 serving as a multimode light exciting means excites multimode light including mode light beams with a first mode number mi, and outputs multimode propagation light including a plurality of propagation mode light beams with a second mode number mo that is smaller than the first mode number mi.

The multimode fiber (MMF) 222 serving as the multimode transmission medium has waveguide modes with a third mode number mf that is equal to or more than the second mode number mo. The multimode fiber (MMF) 222 stably guides the multimode propagation light outputted from the multimode medium 221 to the mode separating unit 231.

The mode separating unit 231 separates the multimode propagation light inputted from the multimode fiber (MMF) 222 into a plurality of single mode light beams (propagation mode light beams). Here, a fourth mode number md that is the number of modes the mode separating unit 231 is able to separate can be equal to the third mode number mf that is the number of waveguide modes of the multimode fiber (MMF) 222.

The single mode light beams separated by the mode separating unit 231 are respectively guided through the plurality of single mode transmission media 232. Specifically, the mode separating unit 231 separates the multimode propagation light guided by the multimode fiber (MMF) 222 into m (=md) number of single mode optical signals s232, and outputs the optical signals s232 coupling them to m number of the single mode transmission media 232 respectively.

The mode separating unit 231 can be configured by applying a mode separation technology using a three-dimensional optical waveguide, a Photonic Lantern, or the like, for example. Each of the single mode transmission media 232 is typically a single mode fiber (SMF). As described above, the mode-separated single mode light is coupled to the single mode fiber (SMF), which makes it possible to apply optical fiber transmission technologies based on the single mode fiber (SMF). In addition, the three-dimensional optical waveguide, the Photonic Lantern, or the like can be configured integrating also the multimode medium 221.

The optical receivers 233 respectively receive the plurality of single mode optical signals s232 through the plurality of single mode transmission media 232 and demodulate them. That is to say, the optical receivers 233 with m number photoelectrically convert all of the mode-separated signal mode optical signals s232, and output received signals s234 respectively. The optical receiver 233 can be a coherent optical receiver or can be configured by applying digital coherent technologies.

The signal selector (the selector) 241 serving as the signal selection means selects only a plurality of demodulated signals s243 corresponding to the plurality of propagation mode light beams from the plurality of received signals s234 respectively outputted by the plurality of light receiving means (the optical receivers 233). The demodulated signals s243 with n pieces selected by the signal selector (the selector) 241 are inputted into the signal processor 242. The number n of selected demodulated signals s243 is equal to or smaller than the number m of single mode light beams (propagation mode light beams) that are guided through the single mode transmission media 232.

The signal processor 242 performs signal processing on all or a part of the plurality of demodulated signals s243, and outputs an output signal s244 obtained by combining the plurality of demodulated signals s243. The signal processor 242 is typically configured by a digital signal processing circuit (DSP).

As mentioned above, in order to achieve sufficiently stable receiving characteristics in the free space optical receiver, it is necessary to enlarge a diameter of the core on the incident side of the multimode medium 221 included in the free space optical receiver 200. However, because the number of propagation modes in the multimode fiber (MMF) increases in proportion to the square of the core diameter, there is the potential that an enormous number of modes are excited in the multimode medium 221 if the core diameter is enlarged. At this time, if the coupling to a lot of higher-order propagation modes arises, the optical intensity per single mode decreases. Consequently, the optical S/N ratio of the optical signal inputted into the optical receiver deteriorates, which makes difficult highly sensitive receiving.

However, the free space optical receiver 200 according to the present example embodiment is configured in which the number of propagation modes excited in the multimode medium 221 is limited. As a result, according to the free space optical receiver 200 of the present example embodiment, it is possible to achieve stable free space optical receiving and prevent the optical S/N ratio from deteriorating.

Because a free space optics (FSO) receiver used for an ultra-long distance free space optics (FSO) system includes a light collection optical system with a quite-narrow viewing angle, the beam of the received laser light is entered nearly vertical to the multimode medium 221. Consequently, there is no need to consider an oblique incident beam that is entered at an angle near to the maximum incident angle θm on the incident side of the multimode medium 221. Therefore, the propagation modes excited on the incident side of the multimode medium 221 are only a relatively small number of propagation modes near to a base mode. The maximum incident angle θm is expressed by the formula of $\theta m = \sin^{-1}(NA)$, where a numerical aperture is represented by NA.

With consideration for the above-mentioned characteristics, the free space optical receiver 200 according to the present example embodiment has a configuration in which the number mo of propagation modes on the output side of the multimode medium 221 is smaller than the number mi of modes on the input side and is more than one. That is to say, the formula of mi>mo>1 holds in the configuration.

The number mf of modes that can be propagated through the multimode fiber (MMF) 222 connecting the multimode medium 221 to the mode separating unit 231 is equal to or smaller than the number md of modes that the mode separating unit 231 can separate. In addition, the number of modes that can be propagated through the core on the output side of the multimode medium 221 is also equal to or smaller than the number of modes that can be propagated through the multimode fiber (MMF) 222.

The above-mentioned configurations can be collectively expressed by the following formulae:

$$mi > mo > 1 \text{ and } mo \leq mf \leq md$$

As the multimode medium 221 serving as the multimode light exciting means, an optical waveguide can be used that includes a core part serving as an optical path and a tapered structure with the diameter of the core part decreasing from the input side toward the output side. The optical waveguide includes a multimode fiber (MMF). As the multimode fiber (MMF) 222 serving as the multimode transmission medium, a few-mode fiber (FMF) can be used that propagates a few modes. As the FMF, a multimode fiber can be applied in which the upper limit of the number of modes ranges from 3 modes to about 20 modes, for example.

According to the free space optical receiver 200 with the configuration using the above-mentioned tapered multimode medium 221 and the few-mode fiber (FMF), it is possible to maintain stable coupling between the laser light and the multimode medium 221 even where the fluctuation in the beam spot arises. In addition, it is possible to employ a configuration in which only a few propagation modes near to the excited base mode are selectively propagated, and only the few propagation modes are processed even in stages following the mode separating unit 231. As a consequence, receiving a plurality of modes makes it possible to prevent the fade from arising and to suppress the occurrence of a lot of higher-order modes that causes the S/N deterioration.

That is to say, according to the free space optical receiver 200 having the configuration in which the tapered multimode medium 221 and the FMF are combined with each other, it is possible to satisfy both of the stable receiving in which the fade is prevented from arising and the highly sensitive receiving by suppressing the occurrence of higher-order propagation modes and by preventing the S/N ratio from deteriorating. In addition, the reduction in the number of modes makes it possible to simplify the configuration of the mode separating unit 231 and to reduce the number of optical receivers 233. This makes it possible to reduce the cost of the free space optical receiver 200.

The free space optical receiver 200 can be configured in which the multimode light generating means includes a beam control means 223 for controlling the wave front of the incident laser light s101 in a stage preceding the multimode medium 221 serving as the multimode light exciting means, as illustrated in FIG. 2.

Although the beam spot formed by the light collecting unit 210 is a plane wave, it is likely to excite a higher-order propagation mode when it is focused and enters the multimode medium 221. The beam control means 223 corrects the beam spot of the laser light inputted into the multimode medium 221, which makes it possible to relax such a phenomenon. The beam control means 223 can be implemented by using various optical elements. Specifically, a concave lens, a spot size conversion element, a SELFOC lens, an optical fiber with weak confinement, and the like can be used, for example.

The configuration in which the beam control means 223 is inserted has the effect of stabilizing a propagation mode excited in the multimode medium 221 if fluctuation arises in the beam spot of the laser light. In addition, it has the effect of suppressing coupling to a higher-order propagation mode due to a bend of a fiber or passing through an optical connector while the laser light propagates through the multimode fiber (MMF) 222. As described above, using the beam control means 223 makes it possible to suppress the mode coupling of the laser light during the propagation through the multimode fiber (MMF) 222. This makes it possible to keep the energy of the laser light in a lower-order propagation mode, and further suppress the deterioration of the S/N ratio.

The beam control means 223 can be configured to convert the size of a beam spot of the laser light into a size approximately equal to the diameter of the core part on the input side of the multimode medium 221 serving as the multimode light exciting means. That is to say, the size of the beam spot of the laser light having passed through the beam control means 223 is defocused to a size equal to the core diameter on the incidence plane of the multimode medium 221. In addition, it is desirable to dispose the beam control means 223 immediately anterior to the incidence plane of the multimode medium 221. This is because it is possible to shorten the focal length of the light collecting unit 210 by correcting the light beam to be a plane wave after narrowing the beam spot. This makes it possible to miniaturize the free space optical receiver 200.

Even by the above-mentioned free space optical receiver 200 having the configuration in which the beam control means 223, the tapered multimode medium 221, and the FMF serving as the multimode fiber (MMF) 222 are combined, the same effect as the above can be obtained. That is to say, it is possible to satisfy both of the stable receiving in which the fade is prevented from arising and the highly sensitive receiving by suppressing the occurrence of higher-order propagation modes and by preventing the S/N ratio from deteriorating. In addition, the reduction in the number of modes makes it possible to simplify the configuration of the mode separating unit 231 and to reduce the number of optical receivers 233. This makes it possible to reduce the cost of the free space optical receiver 200.

In the free space optical receiver 200, the optical receivers 233 also generates the received signals s234 with respect to propagation modes that have not been excited in the multimode medium 221. The received signal s234 without a signal, even though it is inputted into the signal processor (DSP) 242, does not only contribute to synthesizing the output signal s244 but also has a disadvantage of increasing noise.

However, the free space optical receiver 200 according to the present example embodiment includes the signal selector (the selector) 241, which disrupts the received signals s234 corresponding to unexcited modes. This makes it possible to decrease the number of signals inputted into the signal processor (DSP) 242 and to prevent the above-mentioned disadvantage from arising.

As mentioned above, the free space optical receiver 200 according to the present example embodiment includes the multimode medium 221 having a tapered structure and the signal selector (the selector) 241. The configuration makes it possible to obtain a double effect of reducing the number of modes and to satisfy both of the stable receiving and the highly sensitive receiving. In addition, adding the wavelength-division multiplexing function to the free space optical receiver 200 makes it possible to achieve high-capacity transmission.

A Third Example Embodiment

Figure 3:
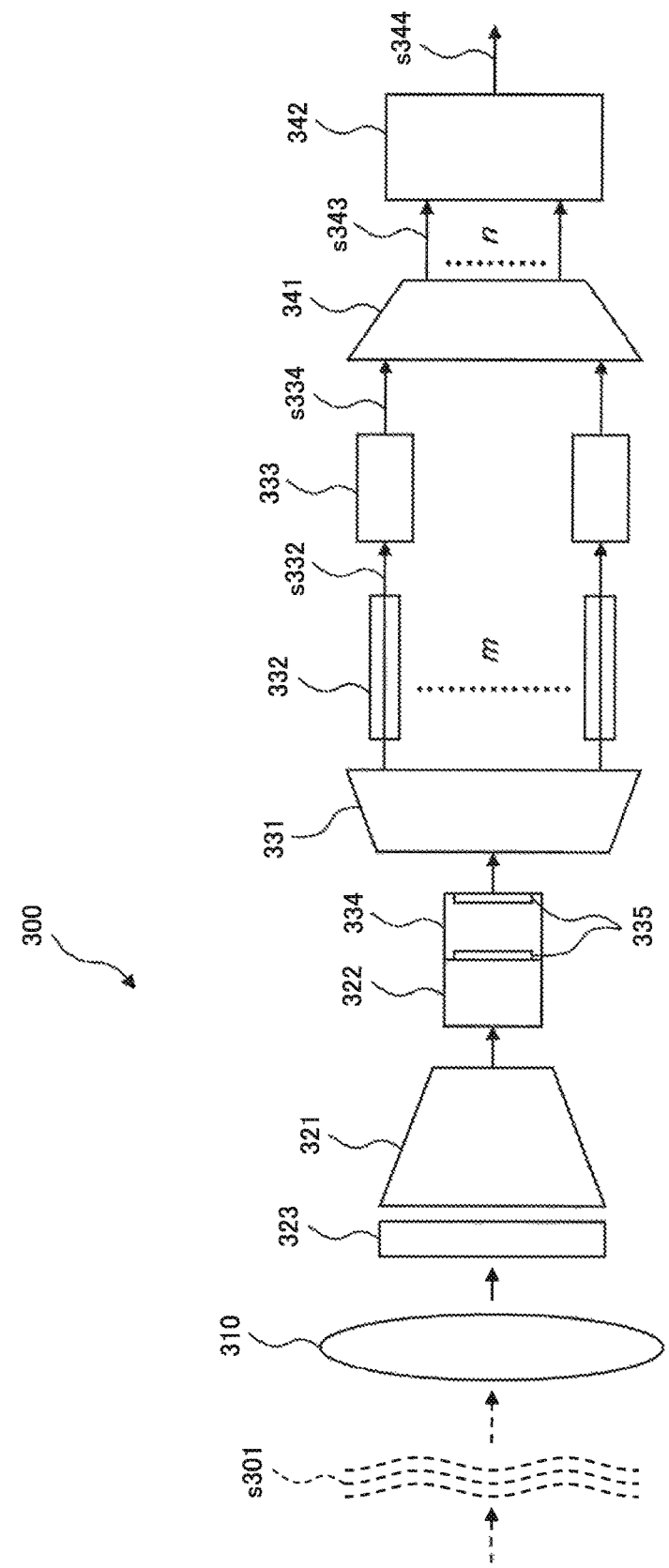
FIG. 3 is a block diagram illustrating a configuration of a free space optical receiver according to a third example embodiment of the present invention.

Next, a third example embodiment of the present invention will be described. FIG. 3 illustrates a configuration of a free space optical receiver 300 according to the third example embodiment of the present invention.

The free space optical receiver 300 according to the present example embodiment includes an optical amplifier that is optically connected to a multimode fiber (MMF) 322 serving as a multimode transmission medium. The optical amplifier may be a multimode optical fiber amplifier (MMFA) 334, typically. Since the other configurations are similar to those of the free space optical receiver 200 according to the second example embodiment, their detailed descriptions are omitted.

Optical amplifier technologies are applied in optical fiber communications in order to achieve high-sensitive optical receiving. In this case, in order to achieve optical receiving with a high-quality S/N ratio, particularly, it is desirable to perform optical amplification disposing an optical amplifier upstream of a receiver. Also in the free space optical receiver 300 according to the present example embodiment, it is desirable for the multimode optical fiber amplifier (MMFA) 334 to be located in a stage preceding a mode separating unit 331 and to be optically connected to the multimode fiber (MMF) 322.

The multimode optical fiber amplifier (MMFA) creates amplified spontaneous emission (ASE) noise with respect to all propagation modes that the MMF can propagate. Consequently, the S/N ratio of the optical signal deteriorates if a MMFA with a large number of propagation modes is used. If the S/N ratio of the optical signal deteriorates in the free space optical receiver 300, the total S/N ratio of demodulated signals s343 inputted into a signal processor (DSP) 342 deteriorates, which makes high-sensitive receiving difficult.

However, the free space optical receiver 300 according to the present example embodiment is configured to limit the number of propagation modes excited in the multimode medium 321 and to apply the multimode optical fiber amplifier (MMFA) 334 to the propagation modes after the multimode fiber (MMF) 322 has propagated them. That is to say, because only the limited number of propagation modes are amplified, it becomes possible to prevent the amplified spontaneous emission (ASE) noise from arising with respect to unwanted modes and to prevent the S/N ratio of the optical signal from deteriorating.

Although the optical amplifier is typically a multimode type optical fiber amplifier as mentioned above, a waveguide type optical amplifier can be used without being limited to this.

The optical amplifier can be configured to have a waveguide mode with a fifth mode number ma. The fifth mode number ma is equal to or larger than the third mode number mf that is the number of waveguide modes of the multimode fiber (MMF) 322, and is equal to or smaller than the fourth number and that is the number of modes the mode separating unit 331 can separate. That is to say, a configuration can be employed in which the following formulae hold:

$$mi > mo > 1 \text{ and } mo \leq mf \leq ma \leq md$$

In the above formula, "mi" represents the number of modes on the input side of the multimode medium 321, and "mo" represents the number of propagation modes on the output side.

As mentioned above, the free space optical receiver 300 according to the present example embodiment is configured to include the multimode medium 321 and the multimode optical fiber amplifier (MMFA) 334 in which the number of waveguide modes is limited. The configuration makes it possible to prevent the total S/N ratio of the demodulated signals s343 inputted into the signal processor (DSP) 342 from deteriorating; therefore, it is possible to satisfy both of the stable receiving and the highly sensitive receiving. In addition, because it is possible to prevent the amplified spontaneous emission (ASE) noise from being emitted to unwanted propagation modes, it is possible to improve the efficiency of the multimode optical fiber amplifier (MMFA) 334. This makes it possible to achieve the low power consumption and the miniaturization of the free space optical receiver 300.

As illustrated in FIG. 3, the free space optical receiver 300 can be configured in which the optical amplifier includes mode field converters 335 to convert a mode shape on the input side and the output side. This makes it possible to prevent an optical loss from arising at both ends of the multimode optical fiber amplifier (MMFA) 334 serving as an optical amplifier. The reason will be described below.

An optical fiber amplifier to which an optical amplification medium is added has an increased refractive index of a core area as compared to a standard optical amplifier without additives. Consequently, the number of modes in the MMFA 334 increases when the core diameter of the multimode fiber (MMF) 322 is equal to that of the multimode optical fiber amplifier (MMFA) 334. This causes the amplified spontaneous emission (ASE) noise to be emitted to unwanted modes and the optical S/N ratio to deteriorate.

In order to avoid the deterioration of the optical S/N ratio, it is necessary to equalize the number of modes that can be propagated through the MMFA 334, the multimode fiber (MMF) 322, and the mode separating unit 331. As a result, the fiber core diameter of the MMFA 334 becomes thinner as compared to that of the input parts of the multimode fiber (MMF) 322 and the mode separating unit 331. If the core diameter differs from each other, a mismatch between mode fields arises; as a result, an optical loss arises at both ends of the MMFA 334.

However, as mentioned above, the free space optical receiver 300 according to the present example embodiment has the configuration in which the multimode optical fiber amplifier (MMFA) 334 includes the mode field converters 335 on the input side and the output side. This makes it possible to prevent the optical loss from arising at both ends of the MMFA 334. The mode field converter 335 is typically a tapered fiber such as a thermally-diffused expanded core (TEC) fiber. Without being limited to this, the mode field converter 335 can be configured by means of a lens optical system.

Next, the operation of a signal selector (a selector) 341 included in the free space optical receiver 300 of the present example embodiment will be described.

In the free space optical receiver 300, a part of the propagation modes of the multimode medium 321 is excited by received laser light s301; however, not all propagation modes are necessarily excited by the signal light. On the other hand, the MMFA 334 also emits the amplified spontaneous emission (ASE) to propagation modes that have not been excited by the signal light. At this time, a configuration is employed to block a received signal s334 including only amplified spontaneous emission (ASE) without signal light being excited, or a received signal s334 with an deteriorated S/N ratio due to superimposition of the amplified spontaneous emission (ASE), from entering the signal processor (DSP) 342. This makes it possible to keep high-quality the total S/N ratio of the demodulated signals s343 that are inputted into the signal processor (DSP) 342.

The signal selector (the selector) 341 included in the free space optical receiver 300 according to the present example embodiment operates so as to select only a signal with a sufficiently large S/N ratio from among m pieces of the received signals s334 and supply the selected signal to the signal processor (DSP) 342. This makes it possible to reduce noise components inputted into the signal processor (DSP) 342 and improve the total S/N ratio of the demodulated signals s343 inputted into the signal processor (DSP) 342.

As mentioned above, the free space optical receiver 300 according to the present example embodiment is configured to include the multimode medium 321, the multimode optical fiber amplifier (MMFA) 334, and the signal selector (the selector) 341. The configuration makes it possible to satisfy both of the stable receiving and the highly sensitive receiving.

Next, the operation of the multimode optical fiber amplifier (MMFA) 334 included in the free space optical receiver 300 according to the present example embodiment will be described.

Figure 4A:
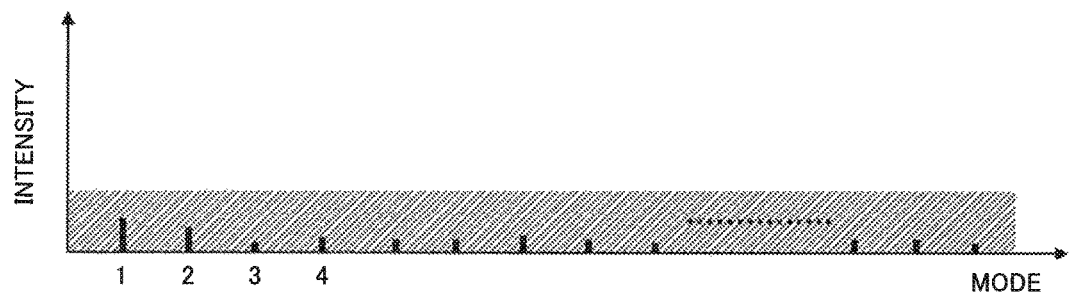
FIG. 4A is a diagram to describe the operation of a multimode optical fiber amplifier included in the free space optical receiver according to the third example embodiment of the present invention, and a mode spectrum of optical amplifier output with the number of propagation modes not limited.
Figure 4B:
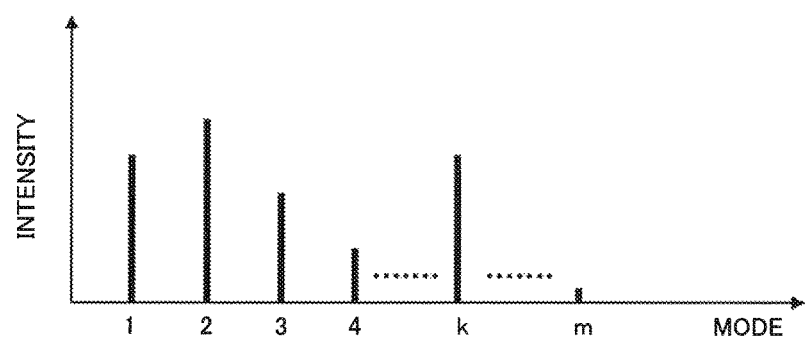
FIG. 4B is a diagram to describe the operation of the multimode optical fiber amplifier included in the free space optical receiver according to the third example embodiment of the present invention, and a mode spectrum of an input signal with the number of propagation modes limited.
Figure 4C:
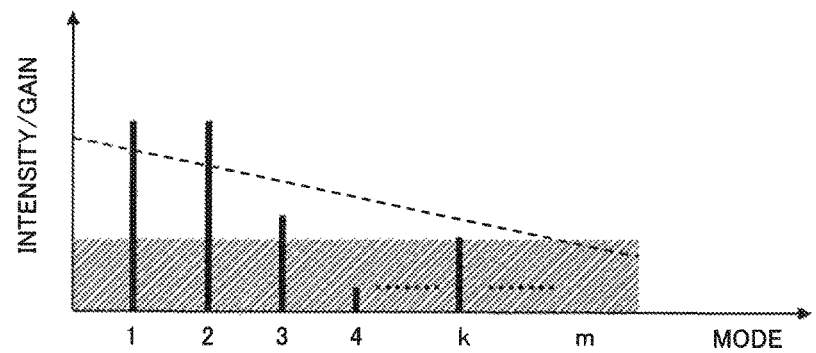
FIG. 4C is a diagram to describe the operation of the multimode optical fiber amplifier included in the free space optical receiver according to the third example embodiment of the present invention, and a mode spectrum of optical amplifier output with the number of propagation modes limited.

FIG. 4A, FIG. 4B, and FIG. 4C are diagrams to describe the operation of the multimode optical fiber amplifier (MMFA) and schematically illustrate signal spectrums of respective modes. The horizontal axis in each figure represents a conceptual mode. The left side represents a lower-order mode, and the right side represents a higher-order mode. The vertical axis in each figure represents signal intensity, and each bar line represents signal intensity of an excited propagation mode.

FIG. 4A is a diagram illustrating a mode spectrum of the output of a multimode optical fiber amplifier (MMFA) having excessively large number of propagation modes. FIG. 4A illustrates a state where the power of received laser light is distributed to a lot of modes, and where the amplified spontaneous mission (ASE) indicated by a shaded area is superimposed. In this case, a high-quality S/N ratio cannot be obtained.

FIG. 4B is a diagram schematically illustrating a mode distribution of input signals of the multimode optical fiber amplifier (MMFA) 334 that is used in the present example embodiment in which the number of propagation modes is limited to m. It can be understood that the light intensity of mode 2 is the strongest, and that a relatively higher-order mode k is second strongly excited. In contrast, FIG. 4B illustrates that the light intensity of mode 4 is weak, and that the excitation of the highest order mode m is very weak.

FIG. 4C is a diagram schematically illustrating a mode distribution of the output signals of the multimode optical fiber amplifier (MMFA) 334 used in the present example embodiment. In the diagram, a broken line diagonally right down represents a gain distribution of the multimode optical fiber amplifier (MMFA) 334 with respect to each mode, and a shaded area represents the intensity of the amplified spontaneous emission (ASE). As illustrated in the diagram, the MMFA 334 has the property that the gain of a higher-order mode becomes lower.

It can be understood from FIG. 4C that signals are completely buried in noise with respect to the mode 4 and the mode m in which the light intensity at the time of inputting is weak. When a signal of a mode with a deteriorated S/N ratio is inputted into the signal processor (DSP) 342, the deterioration in the S/N ratio of the output signal s344 to be synthesized is caused. In addition, it can be understood that the S/N ratio in mode k within a small gain region deteriorates into a level unfit for the creation of the output signal s344.

In such a case, in order to prevent the S/N ratio of the output signal s344 from deteriorating, it is necessary to select only the signals of mode 1, mode 2, and mode 3 with a sufficiently high-quality S/N ratio and to block signals of the modes from mode 4 to mode k, and mode m in which the S/N ratios have deteriorated.

At this time, the signal selector (the selector) 341 included in the free space optical receiver 300 according to the present example embodiment operates so as to select only signals of the modes with a sufficiently high-quality S/N ratio and to input the signals into the signal processor (DSP) 342. This makes it possible to achieve the high sensitivity of the free space optical receiver 300.

Next, the effects of the present example embodiment will be described.

FIG. 5 is a table illustrating configurations of four types of free space optical receivers and respective characteristics. In the first row of the table, a reference configuration is illustrated in which laser light is directly coupled to a single mode fiber (SMF). In the second row and the third row, the configurations of the related free space optical receiver described in Patent Literature 1 are illustrated. The configuration using a bundle fiber is illustrated in the second row, and the configuration is illustrated in the third row in which a single core MMF is converted into a SMF in a tapered shape. In the fourth row, the configuration of the free space optical receiver 300 according to the present example embodiment is illustrated. In the table, "FA" represents a fiber amplifier, and "FMF" represents a few-mode fiber that propagates a few modes. "FM-EDFA" (few-mode Erbium doped optical fiber amplifier) represents an optical fiber amplifier utilizing an Erbium (Er) doped few-mode optical fiber.

The performance evaluation of each free space optical receiver is performed using a value as a conceptual received information amount that is obtained by estimating an S/N ratio from the sum of receivable signal amounts and the total amount of noise superimposed by an optical amplifier. Here, relative evaluation is performed using the reference configuration illustrated in the first row of FIG. 5 as a reference.

The signal amount (S) is calculated from the area of the fiber core that is irradiated with laser light and a conversion efficiency into the SMF. It is assumed that the signal amount (S) is proportional to the area of a core at a fiber end face that is irradiated with a focused beam spot, and that the area of the core of the SMF is equal to 1. Specifically, for example, a MMF having a core diameter of 50 μm, which has a core area that is 25 times as large as a SMF having a core diameter of 10 μm, is capable of coupling 25 times the amount of laser light to beam spots that move randomly. It is assumed that a core-area ratio of the bundle fiber is equal to 10%.

For the tapered fiber used in the configuration at the third row, the efficiency of converting the laser light into the SMF is set at 10%. In contrast, in the configuration illustrated in the fourth row where the laser light is converted into the SMF by means of the mode separation in the free space optical receiver 300 according to the present example embodiment, it is assumed that the laser light can be converted into the SMF without loss in principle. It is also assumed that excessive loss due to the other optical components can be negligible.

It is assumed that the gains of the optical fibers are equal to one another with respect to all the configurations. It is also assumed that ASE emitted by the optical amplifier has the same intensity per mode. The number of modes that the multimode optical fiber amplifier (MMFA) 334 can propagate is assumed to be 15, where the multimode optical fiber amplifier (MMFA) 334 is included in the free space optical receiver 300 according to the present example embodiment (in the fourth row of the table).

The received information amount, which is set as a standard for the performance evaluation of the free space optical receivers, is the ratio of the total sum of signal amounts to the total sum of noise that are obtained from the above-mentioned settings. Because the noises between different modes are non-correlated, the total sum of the noise is calculated by square-root of sum of squares, that is, root mean square (RMS) addition.

The amount of the information that each free space optical receiver can receive, which is calculated based on the above-mentioned assumption, is illustrated in the right column of FIG. 5. It can be understood that the information amount in the configuration described in Patent Literature 1 (the third row) is 2.5 times as much as that in the reference configuration (the first row), whereas the information amount that can be received in the configuration of the present example embodiment (the fourth row) is 6.5 times as much as that in the reference configuration.

As a result, it can be understood that, according to the free space optical receiver 300 of the present example embodiment, it is possible to obtain 2.6 (=6.5/2.5) times the stability of the free space optical receiver described in Patent Literature 1 with respect to the fade having the same intensity.

A Fourth Example Embodiment

Figure 6:
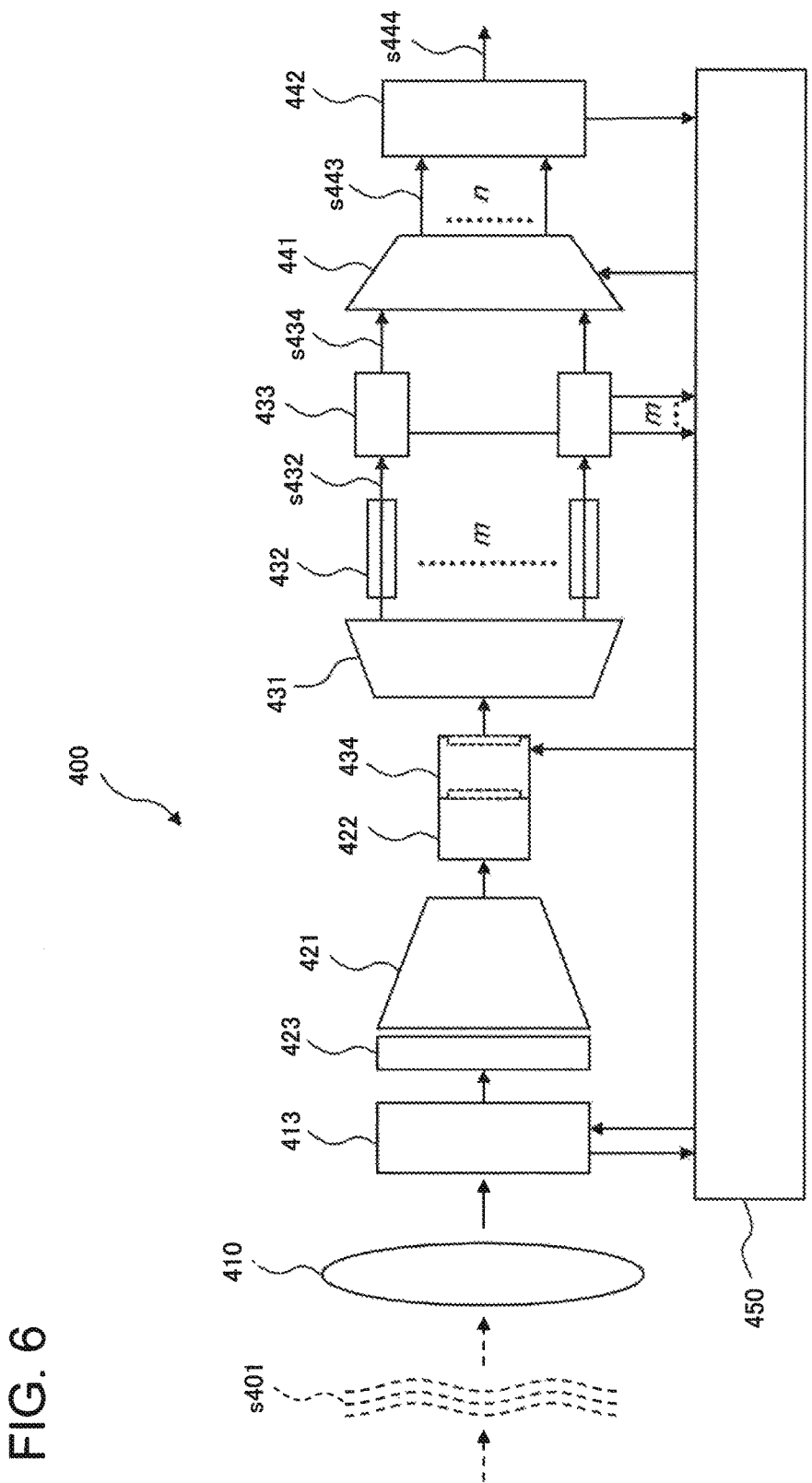
FIG. 6 is a block diagram illustrating a configuration of a free space optical receiver according to a fourth example embodiment of the present invention.

Next, a fourth example embodiment of the present invention will be described. FIG. 6 illustrates a configuration of a free space optical receiver 400 according to the fourth example embodiment of the present invention.

The free space optical receiver 400 according to the present example embodiment further includes an adaptive optical system (AO) 413 serving as an adaptive optical control means in addition to the configuration of the free space optical receiver 300 according to the third example embodiment. The adaptive optical system (AO) 413 is located in a stage preceding a multimode medium 421 serving as a multimode optical excitation means and adaptively controls the wave front of laser light s401.

A controller 450 (a control means) is configured to control at least one of the adaptive optical system (AO) 413, a multimode optical fiber amplifier (MMFA) 434 serving as an optical amplifier, and a signal selector (a selector) 441 serving as a signal selection means. At this time, the controller 450 performs the above-mentioned control based on signal information obtained from at least one of the adaptive optical system (AO) 413, optical receivers 433, and a signal processor (DSP) 442.

The multimode optical fiber amplifier (MMFA) 434 can be configured to include a control signal terminal that receives input of a control signal to control the mode distribution of the gain. The adaptive optical system (AO) 413 can be also configured to include a control signal terminal that receives input of a control signal to set a wave front state.

Since the other configurations are similar to those of the free space optical receiver 300 according to the third example embodiment, their detailed descriptions are omitted.

The adaptive optical system (AO) 413 is typically configured by a deformable mirror (DM) or a spatial light modulator (SLM), a Shack Hartmann detector (SHD), a wave front compensation controller and the like. The adaptive optical system (AO) 413 corrects the wave front of the laser beam that is disturbed due to atmospheric propagation, and ideally operates so that a beam spot of laser light with which an incidence plane of the multimode medium 421 is irradiated may form a point image. The adaptive optical system (AO) 413 can also be configured to have the function of a beam control means 423.

The controller 450 is configured by an electronic circuit or a computer operating with a program, and controls a plurality of functional blocks constituting the free space optical receiver 400.

Next, the operation of the controller 450 will be described in more detail.

The controller 450 can set, in the adaptive optical system (AO) 413, a wave front state that becomes the target of the wave front control, for example. Specifically, for example, a wave front state can be set so that a propagation mode excited in the multimode medium 421 may become a lower-order mode. In order to prevent a signal S/N ratio from deteriorating, it is also possible to make the adaptive optical system (AO) 413 operate so as to reach a wave front state in which the number of excitation modes is at a minimum.

At this time, the controller 450 monitors each intensity of single mode signals s432 obtained from the optical receivers 433, by which an excitation state of a propagation mode in the multimode medium 421 can be detected. It is also possible to control the adaptive optical system (AO) 413 with reference to signal quality information obtained during the signal processing process in the signal processor (DSP) 442.

As described above, the controller 450 controls the adaptive optical system (AO) 413, which makes it possible to reduce the propagation modes excited in the multimode medium 421 and prevent the S/N ratio of the optical signal from deteriorating. This makes it possible to achieve the high sensitivity of the free space optical receiver 400.

The controller 450 can also control the mode distribution of the gain of the multimode optical fiber amplifier (MMFA) 434. Specifically, for example, the output of the amplified spontaneous emission (ASE) to an unwanted mode can be suppressed by controlling the ratio of the gain of lower-order side mode to the gain of higher-order side mode in the multimode optical fiber amplifier (MMFA) 434. This enables the multimode optical fiber amplifier (MMFA) 434 to operate so as to prevent the S/N ratio of the optical signal from deteriorating. At this time, the controller 450 can control the multimode optical fiber amplifier (MMFA) 434 with reference to signal quality information obtained during the signal processing process in the signal processor (DSP) 442.

Without being limited to this, the controller 450 can estimate a mode of the signal light propagated through a multimode fiber (MMF) 422 from the wave front information monitored by the Shack Hartmann detector (SHD) that constitutes the adaptive optical system (AO) 413. Based on the estimated propagation mode, the controller 450 can also feedforward-control the mode distribution of the gain of the multimode optical fiber amplifier (MMFA) 434. This makes it possible to prevent the S/N ratio of the optical signal amplified by the multimode optical fiber amplifier (MMFA) 434 from deteriorating. As a consequence, it is possible to achieve the high sensitivity of the free space optical receiver 400.

The controller 450 can also control the signal selector (the selector) 441 so as to select only a received signal s434 with a sufficiently high-quality S/N ratio, for example. Specifically, first, the optical receivers 433 monitor the intensity of the single mode signals s432, for example. Based on the monitored information, the controller 450 can also control the signal selector (the selector) 441 so as to select only a received signal with a sufficiently high-quality S/N ratio from among the received signals s434 and output the selected signal serving as a demodulated signal s443.

Without being limited to this, the controller 450 can estimate a mode of the signal light propagated through the multimode fiber (MMF) 422 from the wave front information monitored by the Shack Hartmann detector (SHD) that constitutes the adaptive optical system (AO) 413. Based on the estimated propagation mode, the controller 450 can also control a selection state of the signal selector (the selector) 441.

In addition, the controller 450 can be configured to include a storage means. Using the storage means, the controller 450 can learn the relation between the wave front information monitored by the Shack Hartmann detector (SHD) and the propagation mode excited in the multimode medium 421, which makes it possible to estimate a mode excited in the multimode medium 421.

As described above, the controller 450 feedforward-controls the signal selector (the selector) 441 based on the estimated excitation mode, which makes it possible to select a demodulated signal s443 with a sufficiently high-quality S/N ratio very fast. This makes it possible to achieve the high sensitivity of the free space optical receiver 400.

Next, an example of the configuration to monitor signal quality of each mode will be described in detail.

Figure 7:
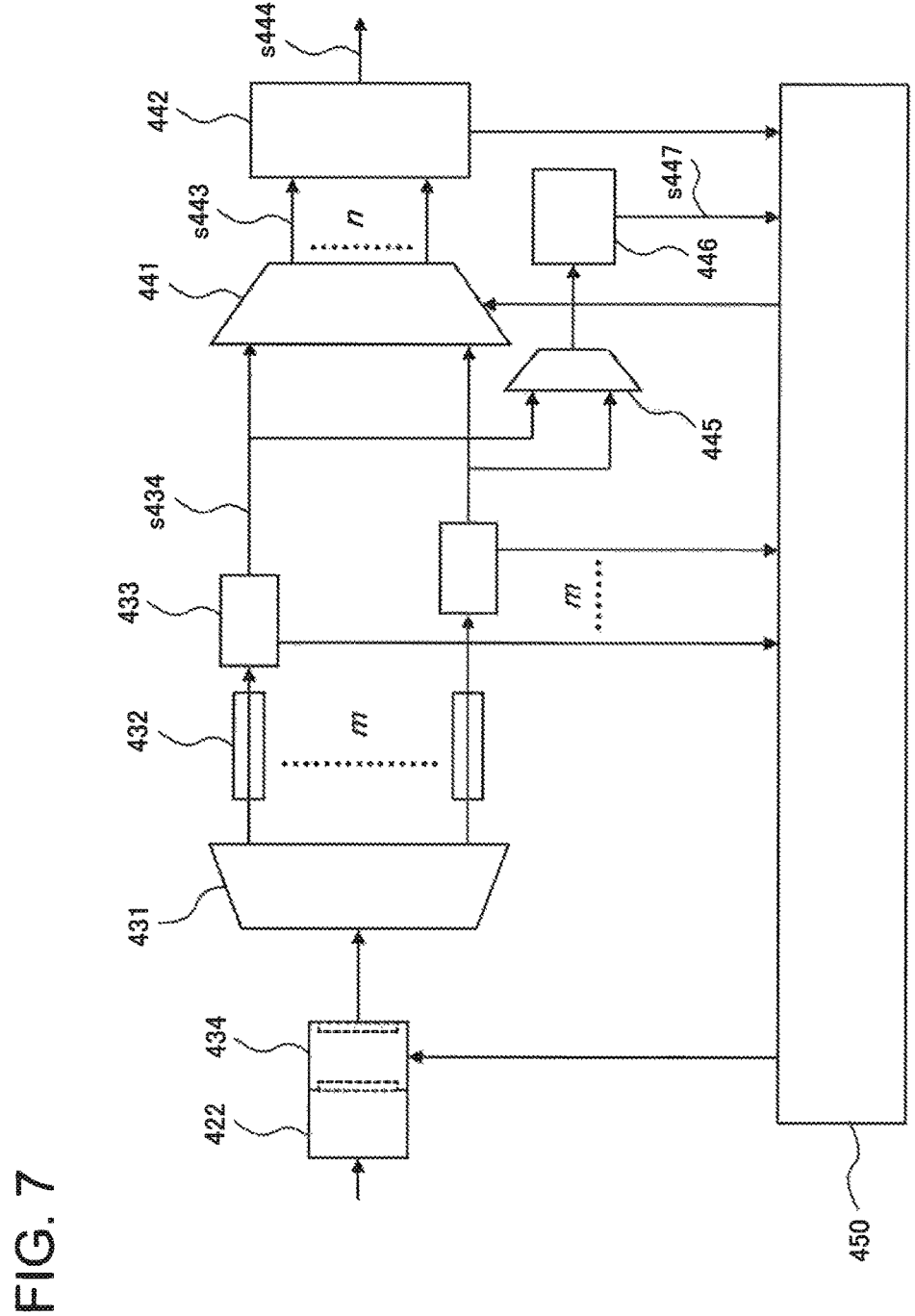
FIG. 7 is a block diagram illustrating another configuration of a free space optical receiver according to the fourth example embodiment of the present invention.

As illustrated in FIG. 7, the free space optical receiver 400 according to the present example embodiment can be configured to further include a received signal selector (a second selector) 445 serving as a received signal selection means and a received signal monitor 446 serving as a received signal monitoring means.

The received signal selector (the second selector) 445 selects a single received signal from among a plurality of received signals s434. That is to say, the received signal selector (the second selector) 445 selects any one signal from among the received signals s434 outputted by m pieces of the optical receivers 433.

The received signal monitor 446 outputs, to the controller 450, a result of monitoring the signal quality of the single received signal selected by the received signal selector (the second selector) 445, as signal information. Specifically, the received signal monitor 446 monitors a single received signal and outputs, to the controller 450, an S/N ratio s447 that is calculated by discriminating between the signal intensity and the noise intensity, as the signal information. Using the S/N ratio s447 obtained from the received signal monitor 446, the controller 450 can control the adaptive optical system (AO) 413, the multimode optical fiber amplifier (MMFA) 434, and the signal selector (selector) 441 that are mentioned above. As an adventitious effect, the control signal of the adaptive optical system (AO) 413 can be generated using the S/N ratio s447 obtained from the received signal monitor 446 instead of the Shack Hartmann detector (SHD). This makes it possible to expect the high sensitivity and the speeding-up of the detection of a wave front error.

The received signal selector (the second selector) 445 may select a single received signal by monitoring received signals from first one to m-th one in turn at regular time intervals, for example.

All or a part of the received signal selector (the second selector) 445, the received signal monitor 446, and the signal selector (the selector) 441 can be integrated into a single LSI (Large Scale Integration) integral with the signal processor (DSP) 442. In this case, the received signal selector (the second selector) 445 can be configured as part of the signal selector (the selector) 441. The received signal monitor 446 can be configured to use a part of the functions that the signal processor (DSP) 442 has.

As described above, the controller 450 can control the adaptive optical system (AO) 413, the multimode optical fiber amplifier (MMFA) 434, and the signal selector (the selector) 441 by monitoring the S/N ratio of the received signal. This makes it possible to achieve the high sensitivity of the free space optical receiver 400.

A Fifth Example Embodiment

Figure 8:
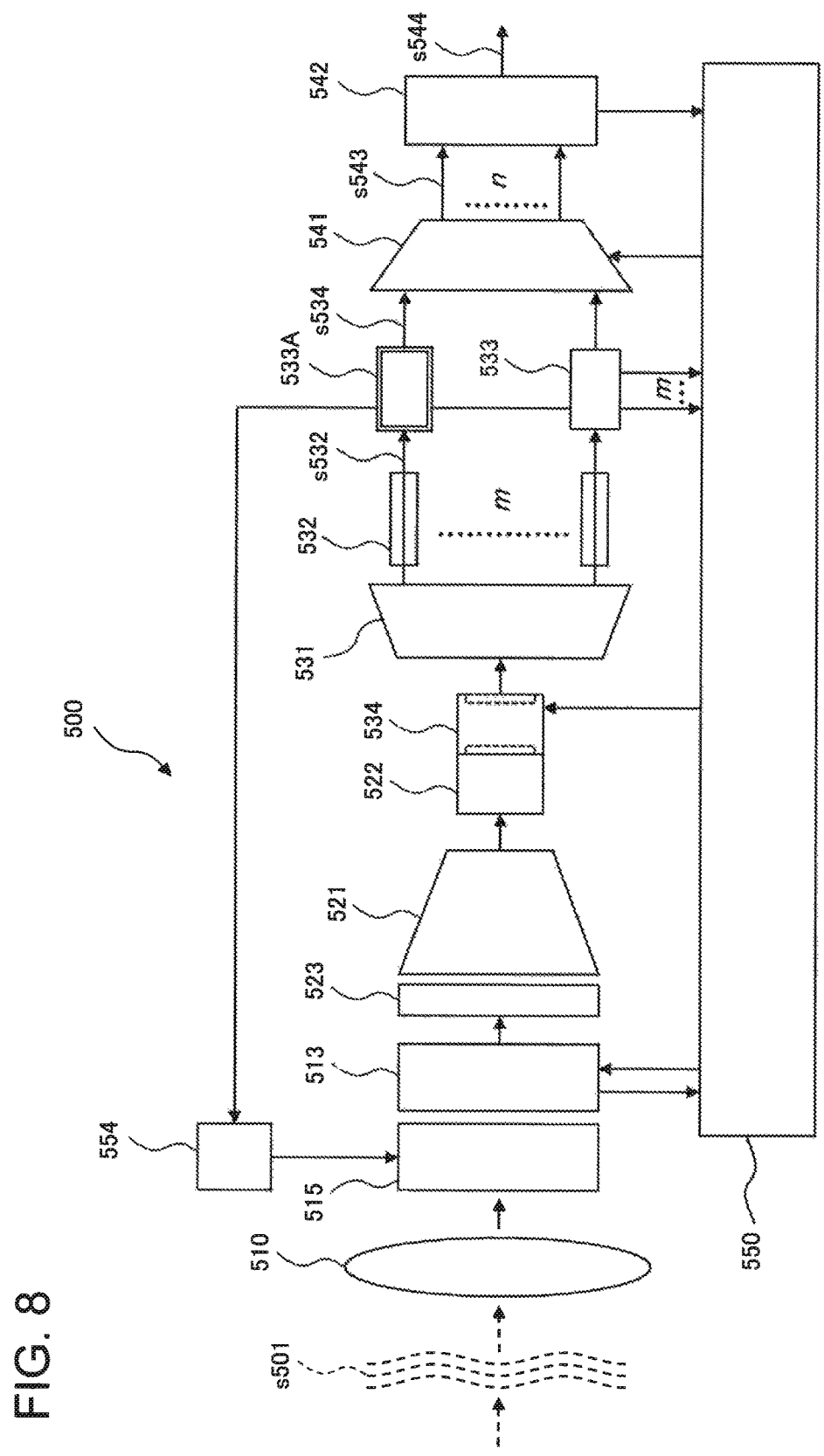
FIG. 8 is a block diagram illustrating a configuration of a free space optical receiver according to a fifth example embodiment of the present invention.

Next, a fifth example embodiment of the present invention will be described. FIG. 8 illustrates a configuration of a free space optical receiver 500 according to the fifth example embodiment of the present invention.

The free space optical receiver 500 according to the present example embodiment further includes a polarization converter 515 serving as a polarization conversion means and a polarization control section 554 serving as a polarization control means in addition to the configuration of the free space optical receiver 400 according to the fourth example embodiment. At least one of a plurality of optical receivers 533 is a dual polarization optical receiver 533A that is capable of detecting a polarization state of the received optical signal. Since the other configurations are similar to those of the free space optical receiver 400 according to the fourth example embodiment, their detailed descriptions are omitted.

The polarization converter 515 has the function of converting a polarization state of laser light s501 into an arbitrary state, and it can be configured using a polarization controller, for example. The polarization converter 515 can be configured to include a control signal terminal that receives input of a control signal to set a polarization state.

The dual polarization optical receiver 533A is an optical receiver that is capable of detecting a polarization state of a single mode signal s532. The dual polarization optical receiver 533A can be typically configured using a coherent optical receiver that is capable of receiving an orthogonal polarized wave separating its H axis from its V axis. In the configuration illustrated in FIG. 8, the dual polarization optical receiver 533A consists of at least one of m pieces of the optical receivers 533. The other optical receivers 533 may be configured to receive only a single polarized wave.

The polarization control section 554 controls the polarization converter 515 based on a polarization state of the signal mode light (propagation mode light) detected by the dual polarization optical receiver 533A. Specifically, the polarization control section 554 monitors the intensity of the H-axis signal and the V-axis signal that are received by the dual polarization optical receiver 533A, and controls the polarization converter 515 based on the monitoring results. This makes it possible to keep the polarization of the laser light s501 a predetermined polarization state. The polarization control section 554 typically controls the polarization of the laser light s501 so as to reach a state of a linear polarization that is suitable for the optical receiver 533 to receive a single polarized wave.

The above-mentioned configuration assumes a free space optics (FSO) system in which laser light with a single polarized wave propagates through the free space. In this case, when the polarization of the laser light rotates during the process where the laser light propagates through the disturbed atmosphere, the polarization of the laser light inputted into the optical receiver 533 becomes an elliptically polarized wave instead of a linearly polarized wave at a transmitting side. If the dual polarization optical receiver 533A demodulates the single mode signal s532 that has become the elliptically polarized wave, the energy of the received light is dispersed into two polarized waves. This causes the S/N ratio of the received signal s534 per polarized wave to deteriorate.

However, the free space optical receiver 500 according to the present example embodiment is configured in which the dual polarization optical receiver 533A monitors a polarization state, and the polarization control section 554 feedback-controls the polarization converter 515 based on the monitored polarization state. The configuration makes it possible to maintain the polarization of the optical signal inputted into the optical receiver 533 for a single polarized wave (the single mode signal s532) in the linearly polarized wave, and prevent the S/N ratio of the received signal s534 from deteriorating.

As described above, feedback-controlling the polarization state of the laser light s501 makes it possible to prevent the S/N ratio of the received signal s534 from deteriorating. This makes it possible to achieve the high sensitivity of the free space optical receiver 500.

If the dual polarization optical receiver 533A is configured to receive all optical signals (the single mode signals s532), the number of light receiving elements in the optical receiver 533 is doubled as compared with the configuration to receive a single polarized wave. In addition, the number of demodulated signals s543 inputted into the signal processor (DSP) 542 is also doubled. This causes the circuit scale of the signal processor (DSP) 542 to increase, and the cost of the free space optical receiver to increase.

However, according to the free space optical receiver 500 of the present example embodiment, it is possible to correct the polarized wave of the laser light s501 to be a linearly polarized wave by using at least one dual polarization optical receiver 533A and the polarization converter 515. The configuration makes it possible to prevent the factor in the increase in cost mentioned above from arising; therefore, it is possible to reduce the cost of the free space optical receiver 500.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-243148, filed on Dec. 1, 2014, the disclosure of which is incorporated herein in its entirety by reference.

The whole or part of the example embodiments disclosed above can be described as, but not limited to, the following supplementary notes.

(Supplementary note 1) A free space optical receiver, comprising: a light collecting means for collecting laser light having propagated through a free space transmission path; a multimode light generating means for receiving input of the laser light collected by the light collecting means, exciting multimode light, and outputting multimode propagation light including a plurality of propagation mode light beams with a number smaller than a number of multimode light beams possible to be excited; and a mode separating means for separating the multimode propagation light into the plurality of propagation mode light beams and outputting the plurality of propagation mode light beams.

(Supplementary note 2) The free space optical receiver according to the Supplementary note 1, wherein the multimode light generating means includes a multimode light exciting means for exciting the multimode light including mode light beams with a first mode number and outputting the multimode propagation light including a plurality of propagation mode light beams with a second mode number smaller than the first mode number, and a multimode transmission medium having waveguide modes with a third mode number and configured to guide the multimode propagation light, the third mode number being equal to or more than the second mode number, wherein a fourth mode number is a number of modes that the mode separating means is able to separate, and the fourth mode number is equal to or more than the third mode number.

(Supplementary note 3) The free space optical receiver according to the Supplementary note 2, wherein the multimode light exciting means is an optical waveguide including a core part serving as an optical path, and the core part has a tapered structure with a diameter of the core part decreasing from an input side toward an output side.

(Supplementary note 4) The free space optical receiver according to the Supplementary note 2 or 3, wherein the multimode light generating means includes a beam control means for controlling a wave front of the laser light in a stage preceding the multimode light exciting means.

(Supplementary note 5) The free space optical receiver according to any one of Supplementary notes 2, 3, and 4, wherein the multimode light generating means includes an optical amplifier optically connected to the multimode transmission medium, and the optical amplifier has a waveguide mode with a fifth mode number that is equal to or larger than the third mode number and equal to or smaller than the fourth mode number.

(Supplementary note 6) The free space optical receiver according to any one of Supplementary notes 2, 3, 4, and 5, further comprising a plurality of single mode transmission media configured to guide the plurality of propagation mode light beams respectively; a plurality of light receiving means for receiving the plurality of propagation mode light beams respectively through the plurality of single mode transmission media; a signal selection means for selecting only a plurality of demodulated signals corresponding to the plurality of propagation mode light beams from a plurality of received signals respectively outputted by the plurality of light receiving means; and a signal processing means for outputting an output signal obtained by combining the plurality of demodulated signals.

(Supplementary note 7) The free space optical receiver according to the Supplementary note 5, wherein at least one of a number of modes outputted by the multimode transmission medium and a number of modes that the optical amplifier is able to propagate and amplify, is equal to or larger than 3 and equal to or smaller than 20.

(Supplementary note 8) The free space optical receiver according to the Supplementary note 6, further comprising a control means, wherein the multimode light generating means includes an optical amplifier optically connected to the multimode transmission medium, and an adaptive optical control means for adaptively controlling a wave front of the laser light in a stage preceding the multimode light exciting means, wherein the control means controls at least one of the adaptive optical control means, the optical amplifier, and the signal selection means based on signal information obtained from at least one of the adaptive optical control means, the light receiving means, and the signal processing means.

(Supplementary note 9) The free space optical receiver according to the Supplementary note 8, further comprising a received signal selection means for selecting a single received signal from among the plurality of received signals; and a received signal monitoring means for outputting, to the control means, a result of monitoring signal quality of the single received signal, as the signal information.

(Supplementary note 10) The free space optical receiver according to the Supplementary note 6, wherein the multimode light generating means includes a polarization conversion means for converting a polarization state of the laser light, at least one of the plurality of light receiving means is a dual polarization optical receiver that is capable of detecting a polarization state of received optical signals, and further comprising a polarization control means for controlling the polarization conversion means based on a polarization state of propagation mode light detected by the dual polarization optical receiver.

(Supplementary note 11) A free space optical receiving method, comprising: collecting laser light having propagated through a free space transmission path; converting the laser light collected into multimode light, and generating multimode propagation light including a plurality of propagation mode light beams with a number smaller than a number of multimode light beams possible to be excited; and separating the multimode propagation light into the plurality of propagation mode light beams.

(Supplementary note 12) The free space optical receiver according to the Supplementary note 5, wherein the optical amplifier includes mode field converters configured to convert a mode shape on an input side and on an output side.

(Supplementary note 13) The free space optical receiver according to any one of the Supplementary notes 1 to 12, wherein the light collecting means includes an optical system with a viewing angle equal to or less than 1 milli-radian.

(Supplementary note 14) The free space optical receiver according to the Supplementary note 4, wherein the multimode light exciting means is an optical waveguide including a core part serving as an optical path, the core part has a tapered structure with a diameter of the core part decreasing from an input side toward an output side, and the beam control means converts a size of a beam spot of the laser light into a size approximately equal to a diameter of the core part on an input side of the multimode light exciting means.

(Supplementary note 15) The free space optical receiver according to the Supplementary note 5, wherein the optical amplifier includes a control signal terminal that receives input of a control signal to control a mode distribution of a gain of the optical amplifier.

(Supplementary note 16) The free space optical receiver according to any one of the Supplementary notes 1 to 5, wherein the multimode light generating means includes an adaptive optical control means for adaptively controlling a wave front of the laser light, and the adaptive optical control means includes a control signal terminal that receives input of a control signal to set a wave front state.

(Supplementary note 17) The free space optical receiver according to any one of the Supplementary notes 1 to 5, wherein the multimode light generating means includes a polarization conversion means for converting a polarization state of the laser light, and the polarization conversion means includes a control signal terminal that receives input of a control signal to set a polarization state.

REFERENCE SIGNS LIST 100, 200, 300 free space optical receiver
110 light collecting means
120 multimode light generating means
130 mode separating means
210, 310, 410, 510 light collecting unit
221, 321, 421, 521 multimode medium
222, 322, 422, 522 multimode fiber (MMF)
223, 323, 423, 523 beam control means
231, 331, 431, 531 mode separating unit
232, 332, 432, 532 single mode transmission media
233, 333, 433, 533 optical receiver
241, 341, 441, 541 signal selector (selector)
242, 342, 442, 542 signal processor (DSP)
334, 434, 534 multimode optical fiber amplifier (MMFA)
335 mode field converter
413 adaptive optical system (AO)
445 received signal selector (second selector)
446 received signal monitor
450 controller
515 polarization converter
554 polarization control section
533A dual polarization optical receiver

What is claimed is:

1. A free space optical receiver, comprising:
a light collecting unit configured to collect laser light having propagated through a free space transmission path;
a multimode light generating unit configured to receive input of the laser light collected by the light collecting unit, excite multimode light, and output multimode propagation light including a plurality of propagation mode light beams with a number smaller than a number of multimode light beams possible to be excited; and
a mode separating unit configured to separate the multimode propagation light into the plurality of propagation mode light beams and output the plurality of propagation mode light beams,
wherein the multimode light generating unit includes
a multimode light exciting unit configured to excite the multimode light including mode light beams with a first mode number and output the multimode propagation light including a plurality of propagation mode light beams with a second mode number smaller than the first mode number, and
a multimode transmission medium having waveguide modes with a third mode number and configured to guide the multimode propagation light, the third mode number being equal to or more than the second mode number,
wherein a fourth mode number is a number of modes that the mode separating unit is able to separate, and the fourth mode number is equal to or more than the third mode number, and
wherein the multimode light exciting unit is an optical waveguide including a core part serving as an optical path, and the core part has a tapered structure with a diameter of the core part decreasing from an input side toward an output side.

2. The free space optical receiver according to claim 1,
wherein the multimode light generating unit includes a beam control unit configured to control a wave front of the laser light in a stage preceding the multimode light exciting unit.

3. The free space optical receiver according to claim 2,
wherein the multimode light generating unit includes an optical amplifier optically connected to the multimode transmission medium, and
the optical amplifier has a waveguide mode with a fifth mode number that is equal to or larger than the third mode number and equal to or smaller than the fourth mode number.

4. The free space optical receiver according to claim 3,
wherein at least one of a number of modes outputted by the multimode transmission medium and a number of modes that the optical amplifier is able to propagate and amplify, is equal to or larger than 3 and equal to or smaller than 20.

5. The free space optical receiver according to claim 2, further comprising
a plurality of single mode transmission media configured to guide the plurality of propagation mode light beams respectively;
a plurality of light receiving unit configured to receive the plurality of propagation mode light beams respectively through the plurality of single mode transmission media;
a signal selection unit configured to select only a plurality of demodulated signals corresponding to the plurality of propagation mode light beams from a plurality of received signals respectively outputted by the plurality of light receiving unit; and
a signal processing unit configured to output an output signal obtained by combining the plurality of demodulated signals.

6. The free space optical receiver according to claim 5, further comprising a control unit,
wherein the multimode light generating unit includes
an optical amplifier optically connected to the multimode transmission medium, and
an adaptive optical control unit configured to adaptively control a wave front of the laser light in a stage preceding the multimode light exciting unit,
wherein the control unit controls at least one of the adaptive optical control unit, the optical amplifier, and the signal selection unit based on signal information obtained from at least one of the adaptive optical control unit, the light receiving unit, and the signal processing unit.

7. The free space optical receiver according to claim 1, further comprising
a plurality of single mode transmission media configured to guide the plurality of propagation mode light beams respectively;
a plurality of light receiving unit configured to receive the plurality of propagation mode light beams respectively through the plurality of single mode transmission media;
a signal selection means for selecting unit configured to select only a plurality of demodulated signals corresponding to the plurality of propagation mode light beams from a plurality of received signals respectively outputted by the plurality of light receiving means; unit; and
a signal processing unit configured to output an output signal obtained by combining the plurality of demodulated signals.

8. The free space optical receiver according to claim 7, further comprising a control unit,
wherein the multimode light generating means unit includes
an optical amplifier optically connected to the multimode transmission medium, and
an adaptive optical control unit configured to adaptively control a wave front of the laser light in a stage preceding the multimode light exciting unit,
wherein the control unit controls at least one of the adaptive optical control unit, the optical amplifier, and the signal selection unit based on signal information obtained from at least one of the adaptive optical control unit, the light receiving unit, and the signal processing unit.

9. The free space optical receiver according to claim 8, further comprising
a received signal selection unit configured to select a single received signal from among the plurality of received signals; and
a received signal monitoring unit configured to output, to the control unit, a result of monitoring signal quality of the single received signal, as the signal information.

10. The free space optical receiver according to claim 1, wherein the multimode light generating unit includes a beam control unit configured to control a wave front of the laser light in a stage preceding the multimode light exciting unit.

11. The free space optical receiver according to claim 1, wherein the multimode light generating unit includes an optical amplifier optically connected to the multimode transmission medium, and
the optical amplifier has a waveguide mode with a fifth mode number that is equal to or larger than the third mode number and equal to or smaller than the fourth mode number.

12. A free space optical receiver, comprising:
a light collecting unit configured to collect laser light having propagated through a free space transmission path;
a multimode light generating unit configured to receive input of the laser light collected by the light collecting unit, excite multimode light, and output multimode propagation light including a plurality of propagation mode light beams with a number smaller than a number of multimode light beams possible to be excited; and
a mode separating unit configured to separate the multimode propagation light into the plurality of propagation mode light beams and output the plurality of propagation mode light beams,
wherein the multimode light generating unit includes
a multimode light exciting unit configured to excite the multimode light including mode light beams with a first mode number and output the multimode propagation light including a plurality of propagation mode light beams with a second mode number smaller than the first mode number, and
a multimode transmission medium having waveguide modes with a third mode number and configured to guide the multimode propagation light, the third mode number being equal to or more than the second mode number,
wherein a fourth mode number is a number of modes that the mode separating unit is able to separate, and the fourth mode number is equal to or more than the third mode number,
wherein the multimode light generating unit includes an optical amplifier optically connected to the multimode transmission medium, and
the optical amplifier has a waveguide mode with a fifth mode number that is equal to or larger than the third mode number and equal to or smaller than the fourth mode number.

13. The free space optical receiver according to claim 11, wherein at least one of a number of modes outputted by the multimode transmission medium and a number of modes that the optical amplifier is able to propagate and amplify, is equal to or larger than 3 and equal to or smaller than 20.

14. The free space optical receiver according to claim 1, further comprising
a plurality of single mode transmission media configured to guide the plurality of propagation mode light beams respectively;
a plurality of light receiving unit configured to receive the plurality of propagation mode light beams respectively through the plurality of single mode transmission media;
a signal selection unit configured to select only a plurality of demodulated signals corresponding to the plurality of propagation mode light beams from a plurality of received signals respectively outputted by the plurality of light receiving unit; and
a signal processing unit configured to output an output signal obtained by combining the plurality of demodulated signals.

15. The free space optical receiver according to claim 14, further comprising a control unit,
wherein the multimode light generating unit includes
an optical amplifier optically connected to the multimode transmission medium, and
an adaptive optical control unit configured to adaptively control a wave front of the laser light in a stage preceding the multimode light exciting unit,
wherein the control unit controls at least one of the adaptive optical control unit, the optical amplifier, and the signal selection unit based on signal information obtained from at least one of the adaptive optical control unit, the light receiving unit, and the signal processing unit.

16. The free space optical receiver according to claim 12, further comprising
a plurality of single mode transmission media configured to guide the plurality of propagation mode light beams respectively;

a plurality of light receiving unit configured to receive the plurality of propagation mode light beams respectively through the plurality of single mode transmission media;

a signal selection unit configured to select only a plurality of demodulated signals corresponding to the plurality of propagation mode light beams from a plurality of received signals respectively outputted by the plurality of light receiving unit; and a signal processing unit configured to output an output signal obtained by combining the plurality of demodulated signals.

17. The free space optical receiver according to claim 12, wherein at least one of a number of modes outputted by the multimode transmission medium and a number of modes that the optical amplifier is able to propagate and amplify, is equal to or larger than 3 and equal to or smaller than 20.

* * * * *